(12) United States Patent
Wang et al.

(10) Patent No.: US 10,218,418 B2
(45) Date of Patent: Feb. 26, 2019

(54) RELAY PRECODER SELECTION METHOD FOR TWO-WAY AMPLIFY-AND-FORWARD MIMO RELAY SYSTEMS AND COMMUNICATION DEVICES USING THE SELECTION METHOD OR THE SELECTED RELAY PRECODER

(71) Applicant: NATIONAL TSING HUA UNIVERSITY, Hsinchu (TW)

(72) Inventors: Chin-Liang Wang, Hsinchu (TW); Jyun-Yu Chen, Hsinchu (TW); Yi-Hsuan Peng, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 184 days.

(21) Appl. No.: 15/335,625

(22) Filed: Oct. 27, 2016

(65) Prior Publication Data
US 2017/0294946 A1    Oct. 12, 2017

(30) Foreign Application Priority Data
Apr. 11, 2016    (TW) .............................. 105111204 A

(51) Int. Cl.
*H04B 7/04*        (2017.01)
*H04B 7/0456*    (2017.01)
(Continued)

(52) U.S. Cl.
CPC ......... *H04B 7/0456* (2013.01); *H04B 7/0413* (2013.01); *H04B 7/15507* (2013.01)

(58) Field of Classification Search
None
See application file for complete search history.

(56) References Cited

U.S. PATENT DOCUMENTS

2009/0147728 A1    6/2009    Atia et al.

FOREIGN PATENT DOCUMENTS

CN    102332943    1/2012

OTHER PUBLICATIONS

Hwang et al , Finite Feedback MIMO precoding for the Two-Way ampify-and-forward relay network, Apr. 2014 (Year: 2014).*

(Continued)

*Primary Examiner* — Vinncelas Louis
(74) *Attorney, Agent, or Firm* — Amin, Turocy & Watson LLP

(57) ABSTRACT

This invention provides a relay precoder selection method for two-way amplify-and-forward multiple-input multiple-output (MIMO) relay systems and communication devices using the selection method or the selected relay precoder. According to the relationship between a relay precoder and the singular values of the effective MIMO channels, a set of candidate relay precoders are constructed based on the singular vector subspaces of cascaded MIMO channels, and one of them is selected for meeting a specific design criterion, such as the minimum sum of mean-squared errors, the maximum sum of channel capacities, and the minimum or maximum sum of condition numbers, where the condition number is defined as the ratio of the largest to the smallest singular value of a MIMO channel. As compared with the iterative design methods with the best performance, this invention achieves close performance while requiring much lower computational complexity.

7 Claims, 7 Drawing Sheets

(51) Int. Cl.
H04B 7/0413 (2017.01)
H04B 7/155 (2006.01)

(56) References Cited

OTHER PUBLICATIONS

Wang et al, Joint source and relay precoding designs for MIMO two way relaying based on MSE criterion, (Year: 2011).*
Wang et al, A precoder design for two way amplify and forward MIMO relay systems with linear receivers, (Year: 2014).*
Wang, et al. "Relay Precoder Designs for Two-Way AF MIMO Relay Systems: An Eigenmode Selection Approach" ITCOM 2016 Spring—National Ilan University. Published date Jan. 28, 2016.
Wang, et al. "Relay Precoder Designs for Two-Way Amplify-and-Forward MIMO Relay Systems: An Eigenmode-Selection Approach" TWC 2016—IEEE Transactions on Wireless Communications, vol. 15, No. 7. Published dated Apr. 12, 2016, pp. 5127-5137.
Wang, et al. "Low-Complexity Relay Precoder Designs for Two-Way AF MIMO Relay Systems" ICC 2016 Spring—Malaysia, Kuala Lumpur—IEEE Signal Processing for Communications Symposium. Published date May 26, 2016.
Taiwanese Office Action for Taiwanese Patent Application No. 105111204 dated Feb. 21, 2017.

* cited by examiner

First Phase

Second Phase

RELAY PRECODER SELECTION METHOD FOR TWO-WAY AMPLIFY-AND-FORWARD MIMO RELAY SYSTEMS AND COMMUNICATION DEVICES USING THE SELECTION METHOD OR THE SELECTED RELAY PRECODER

FIELD OF THE INVENTION

The present invention relates to data communication techniques, and more particularly, to a relay precoder selection method for two-way amplify-and-forward (AF) multiple-input multiple-output (MIMO) relay systems, communication devices using the selection method, and relay communication devices equipped with the relay precoder based on the selection method.

BACKGROUND OF THE INVENTION

In wireless communication technology, cooperative communication has been a popular research subject. In particular, a relay-assisted system has attracted much attention as one of the important research topics. Traditionally, in a one-way relay system with two terminals, only one terminal is allowed to transmit or receive signals (one way) at one point in time, so four time slots are needed to accomplish an information exchange between the two terminals via the relay. On the other hand, a two-way relay system allows two terminals to transmit signals to the relay simultaneously, and then the superimposed signal is broadcasted by the relay to the two terminals. Hence, only two time slots are required to accomplish an information exchange via the relay, effectively improving the spectrum utilization efficiency of the conventional one-way relay systems.

Although a two-way relay system provides better efficiency in spectrum utilization, the design of a corresponding relay precoder is generally more challenging. An iterative method, for example, is a strategy that provides the optimum performance at the cost of high design complexity. Currently, there are methods that reduce the design complexity of such precoders, for example, by using generalized singular value decomposition (GSVD) to diagonalize the effective multiple-input multiple output (MIMO) channels in the two-way relay system, or by designing a relay precoder with performance close to that of the iterative method using Gram-Schmidt orthogonalization. However, such low-complexity relay precoders are either unable to deliver sufficient performance or strictly limited in the number of antennas in the operating environment. Therefore, there is a need for a solution that addresses the aforementioned issues in the prior art.

SUMMARY OF THE INVENTION

The first objective of the present invention is to provide a relay precoder selection method for two-way AF MIMO relay systems, which includes: obtaining two-way MIMO channel information between at least two terminals and a relay; constructing a candidate relay precoding set based on the two-way MIMO channel information; and selecting a relay precoder with the best performance from the candidate relay precoding set.

The second objective of the present invention is to provide a communication device for performing the aforementioned relay precoder selection method for two-way AF MIMO relay systems.

The third objective of the present invention is to provide a relay communication device that is equipped with a relay precoder with the best performance selected by the aforementioned relay precoder selection method for two-way AF MIMO relay systems.

With the relay precoder selection method for two-way AF MIMO relay systems in accordance with the present invention, a communication device that uses the selection method, and a relay communication device that is equipped with the selected relay precoder, the best relay precoder can be obtained from a finite relay precoding set to meet a specific design criterion. This allows the two-way relay systems to have lower computational complexity while providing performance close to that of the iterative algorithm of the prior art. In other words, the cost is reduced and the transmission efficiency is improved.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand other advantages and functions of the present invention after reading the disclosure of this specification. The present disclosure may also be practiced or applied with other different implementations. Based on different contexts and applications, the various details in this specification can be modified and changed without departing from the spirit of the present disclosure.

The following notations are defined in order to help understand the various formulae recited in the embodiments of the present invention. Superscripts $(\bullet)^T$, $(\bullet)^H$, and $(\bullet)^{-1}$ denote the transpose, conjugate transpose, and inverse operations of a matrix, respectively; $\det(\bullet)$, $\text{tr}(\bullet)$, and $\|\bullet\|_F$ denote determinant, trace, and Frobenius norm of a matrix, respectively; $E[\ ]$ and $\otimes$ stand for the statistical expectation and the Kronecker product operations, respectively; $\text{vec}(\bullet)$ and $\text{mat}(\bullet)$ denote the matrix vectorization operation and the corresponding inverse operation, respectively; $\text{diag}\{a_m;$ m=1, 2, . . . , M} indicates an M×M diagonal matrix with entries $a_m$; $I_M$ represents the M×M identity matrix; $[A]_{m,n}$ indicates the (m,n) th element of matrix A; $CN(a, \Sigma)$ stands for a complex Gaussian random vector with mean vector a and covariance matrix $\Sigma$; d[A] is the column vector of all the main diagonal elements of matrix A; and (a)* means the conjugate operation of a complex number a.

The following embodiments of the present invention are described in the context of two terminals and a relay all equipped with M antennas, but the present invention is not limited as such, i.e., the two terminals and the relay may adopt different number of antennas.

Figure 1:
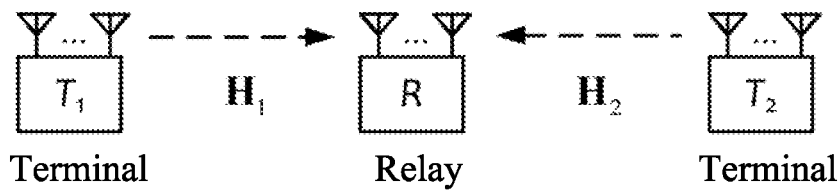
FIG. 1 is a schematic diagram illustrating a two-way AF MIMO relay system model.
Figure 1:
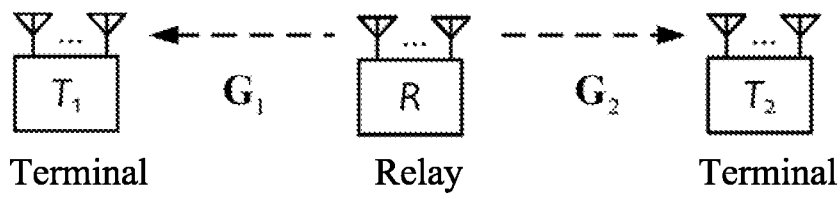
Figure 2:
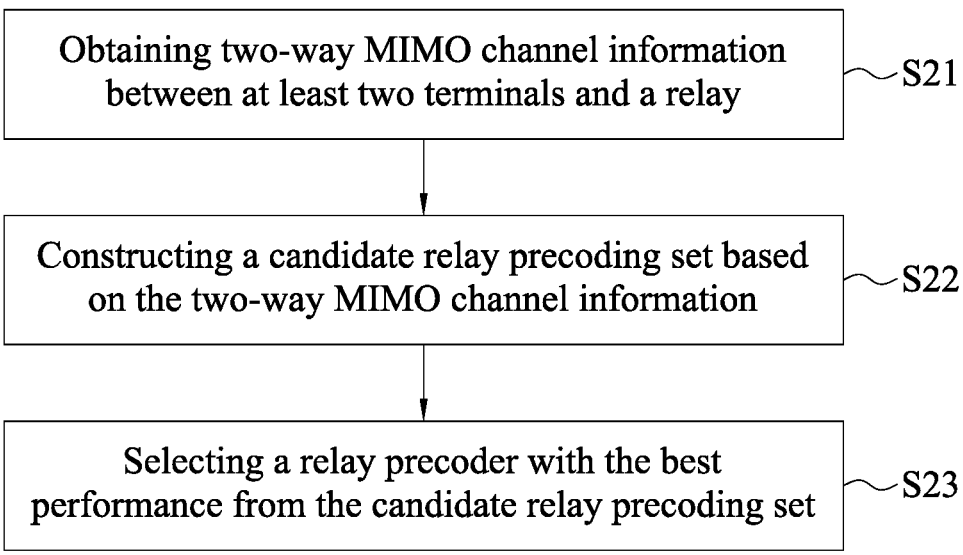
FIG. 2 is a flowchart illustrating a relay precoder selection method for two-way AF MIMO relay systems in accordance with the present invention.

Referring to both FIGS. 1 and 2, the operations of a two-way amplify-and-forward (AF) multiple-input multiple-output (MIMO) relay system disclosed by the present invention can be divided into two phases. In the first phase, a first terminal $T_1$ and a second terminal $T_2$ simultaneously transmit their signals $x_1=F_1s_1$ with power $P_1$ and $x_2=F_2s_2$ with power $P_2$, respectively, to a relay (relay communication device) R, wherein $s_i$ denotes the information signal vector transmitted by $T_i$ and $F_i$ stands for the precoding matrix at $T_i$, and $E[s_is_i^T]=I_M$, $i\in\{1,2\}$. Then the received signal vector $y_R$ at the relay R can be expressed as $y_R=H_1x_1+H_2x_2+n_R$, wherein $H_i$ is the full-rank MIMO channel matrix from $T_i$ to R, $i\in\{1,2\}$, and $n_R \sim CN(\underline{0},\sigma^2 I_m)$ is the additive white Gaussian noise (AWGN) vector with zero mean vector $\underline{0}$ and variance $\sigma^2$ at the relay R.

In the second phase, the relay R performs precoding on the received signal vector $y_R$ with the precoder $F_R$, and broadcasts the precoded signal with power $P_R$ to the two terminals $T_1$ and $T_2$. The signal vector $y_i$ received by $T_i$ from the relay R can be written as $$y_i = G_i F_R H_i x_i + G_i F_R H_j x_j + G_i F_R n_R + n_i,$$

wherein $i,j\in\{1,2\}$, $j\neq i$, $G_i$ is the full-rank MIMO channel matrix from R to $T_i$, and $n_i \sim CN(\underline{0},\sigma^2 I_m)$ is the AWGN vector at $T_i$. It should be noted that if channel reciprocity holds, the above full-rank MIMO channel matrix $G_i$ is simply replaced by $H_i^T$ and $G_j$ is replaced by $H_j^T$, but the present invention is not limited thereto.

Since terminal $T_i$ knows its own transmitted signal $x_i$, the self-interference $G_i F_R H_i x_i$ can easily be cancelled with the known channel knowledge $G_i F_R H_i$. Then the effective received signal vector at $T_i$ can be written as $\hat{y}_i = \tilde{H}_i s_j + \tilde{n}_i$; wherein $\tilde{H}_i \triangleq G_i F_R H_j F_j$ is the effective MIMO channel from $T_j$ to $T_i$ and $\tilde{n}_i \triangleq G_i F_R n_R + n_i$ is the equivalent noise vector at $T_i$. After the self-interference cancellation, a linear decoder $W_i$ is then used at $T_i$ to recover the data transmitted from the other terminal, given by $\hat{s}_j = W_i \hat{y}_i$. Accordingly, a mean-squared error (MSE) matrix of the signal recovered at $T_i$ can be represented as:

$$E_i(F_R, W_i) \triangleq \Sigma\{(\hat{s}_j-s_j)(\hat{s}_j-s_j)^H\} = (W_i\tilde{H}_i-I_M)(W_i\tilde{H}_i-I_M)^H + W_i E_{\tilde{n}_i} W_i^H,$$

wherein $E_{\tilde{n}_i} \triangleq E[\tilde{n}_i\tilde{n}_i^H] = \sigma^2 G_i F_R F_R^H G_i^H + \sigma^2 I_m$ is the equivalent noise covariance matrix. The MSE of the mth data stream at $T_i$ is given by the mth main diagonal element:

$$mse_{i,m} \triangleq E[|s_{j,m}-s_{j,m}|^2] = [E_i(F_R, W_i)]_{m,m}, i,j\in\{1,2\}, j\neq i, \text{ and } m\in\{1,2,\ldots,M\}.$$

With a given relay precoder $F_R$ and the maximum transmission power of the relay being constrained to $P_R$, an optimal decoder $W_i^{opt}$ for terminal $T_i$ can be obtained by solving an optimization problem as follows:

$$\min_{F_R, W_1, W_2} f(d[E_1(F_R, W_1)]) + f(d[E_2(F_R, W_2)]);$$

$$\text{s.t. } tr\left\{F_R\left(\sum_{i=1}^{2} H_i F_i F_i^H H_i^H + \sigma^2 I_M\right)F_R^H\right\} \leq P_R;$$

$$W_i^{opt} = \tilde{H}_i^H(\tilde{H}_i\tilde{H}_i^H + \Sigma_{\tilde{n}_i})^{-1}, i \in \{1, 2\}.$$

By substituting the optimal decoder $W_i^{opt}$ into the original optimization problem, the optimal relay precoder $F_R^{opt}$ can be further determined. By substituting $F_R^{opt}$ into the equation above, the optimal decoders of the two terminals $W_i^{opt}$, $i\in\{1,2\}$, can be updated. This two-phase optimization method has the property that, once the relay precoder is determined, the terminal decoders are always optimal. Therefore, the present invention focuses on relay precoder designs as described below.

In order to implement the desired design, the behavior of the main diagonal elements of the MSE matrices in terms of the relay precoder and the first/second terminal decoders is analyzed. Based on the analyzed behavior, a set of candidate relay precoders based on the singular vector subspaces of the MIMO channels is constructed.

The MSE $J_i$ of all data streams from terminal $T_j$ at terminal $T_i$ can be expressed as:

$$J_i = tr\left\{\left(I_M + \tilde{H}_i^H \Sigma_{\tilde{n}_i}^{-1} \tilde{H}_i\right)^{-1}\right\} = \sum_{m=1}^{M} [E_i^o(F_R)]_{m,m}$$

and the channel capacity $C_i$ of the corresponding MIMO channel from $T_j$ to $T_i$ is given by $$C_i = \log_2 det(I_M + \tilde{H}_i^H \Sigma_{\tilde{n}_i}^{-1} \tilde{H}_i) = -\sum_{m=1}^{M} \log_2[E_i^o(F_R)]_{m,m},$$

wherein the second equation follows the fact that any unitary rotation matrix $F_j$ can be chosen for precoding at $T_j$ such that the matrix $\tilde{H}_i^H \Sigma_{\tilde{n}_i}^{-1} \tilde{H}_i$ is diagonal. From the above two equations, it is obvious that the two functions are strongly linked to all the diagonal elements of $E_i^o(F_R)$. This linkage enables us to develop a relay precoder design with respect to the main diagonal elements of $E_i^o(F_R)$.

$A=U_A \Lambda_A V_A^H$ is denoted as the singular value decomposition (SVD) form of a channel matrix A, wherein the rows of $U_A$ and the columns of $V_A$ are called the left-singular and right-singular vectors of A, respectively, and the diagonal elements of $\Lambda_A=\text{diag}\{\lambda_{A,1}, \lambda_{A,2} \ldots \lambda_{A,M}\}$ represent the singular values of A and are arranged in descending order without loss of generality, that is, $\lambda_{A,1} \geq \lambda_{A,2} \ldots \geq \lambda_{A,M}$. Following these notations, the SVD forms of the forward (from the two terminals to the relay) MIMO channel $H_j$ and the backward (from the relay to the two terminals) MIMO channel $G_i$ can be expressed by $H_j=U_{H_j}\Lambda_{H_j}V_{H_j}^H$ and $G_i=U_{G_i}\Lambda_{G_i}V_{G_i}^H$ with $\Lambda_{H_j}=\text{diag}\{\lambda_{H_{j,1}}, \lambda_{H_{j,2}} \ldots \lambda_{H_{j,M}}\}$ and $\Lambda_{G_i}=\text{diag}\{\lambda_{G_{i,1}}, \lambda_{G_{i,2}} \ldots \lambda_{G_{i,M}}\}$, respectively. Assume that the precoder at terminal $T_j$ is $F_j=\sqrt{(P_j/M)}I_M=\sqrt{\rho_j}I_M$, $j\in\{1,2\}$, and that the relay precoding matrix takes the form $F_R=\alpha V_{G_i}U_{H_j}^H$, the MSE matrix $E_i^o(F_R)$ can be rewritten as:

$$E_i^o(F_R)=\rho_j(\Omega_i+\sigma^2 I_M)^{-1}(\alpha^2\sigma^2\Lambda_{G_i}^2+\sigma^2 I_M),$$

wherein $\Omega_i=\alpha^2\Lambda_{G_i}(\rho_j\Lambda_{H_j}^2+\sigma^2 I_M)\Lambda_{G_i}$ and $\alpha$ is a scaling factor that must be chosen to satisfy $$tr\left\{F_R\left(\sum_{i=1}^{2} \rho_i H_i H_i^H + \sigma^2 I_M\right)F_R^H\right\} \leq P_R.$$

From the equation above, it is clear that the mth eigenvalue of $\Omega_i$ can be expressed as $$\varphi_{\Omega,m} = \alpha^2 \sigma^2 \lambda_{G_i,m}^2 + \lambda_{\tilde{H}_{i,m}}^2,$$

where $$\lambda_{\tilde{H}_{i,m}} = \alpha \sqrt{\rho_j} \lambda_{G_i,m} \lambda_{H_j,m}$$

is the mth singular value of the effective MIMO channel $\tilde{H}_i$ (i.e., $G_i F_R H_j F_j$) and in $m \in \{1, 2, \ldots, M\}$. Consequently, a lower bound of the MSE can be expressed as follows:

$$mse_{i,m} \geq \widetilde{mse}_{i,m} = \rho_j \frac{\sigma^2 \alpha^2 \lambda_{G_i,m}^2 + \sigma^2}{\lambda_{\tilde{H}_{i,m}}^2 + \sigma^2 \alpha^2 \lambda_{G_i,m}^2 + \sigma^2},$$

wherein $i, j \in \{1,2\}$, $j \neq i$, and $m \in \{1, 2, \ldots, M\}$. It can be seen that the performance of the MSE is dominated by the singular value of the effective MIMO channel.

According to the above, the effective MIMO channels $\tilde{H}_1$ and $\tilde{H}_2$ both have multiple eigenmodes, and these eigenmodes can be adjusted with appropriate design $F_R$ based on the cascade effect of the backward MIMO channel $G_i$, the relay precoding matrix $F_R$, and the forward MIMO channel $H_j$ combined with the terminal precoder $F_j$, and further transmission efficiency of the relay system can be improved.

For ease of illustration, the terminal precoder $F_j$ is assumed to have the equal-power form (i.e., $F_j = \sqrt{\rho_j} I_m$, $j \in \{1,2\}$) in the following. However, the relay precoder design of the present invention can also be applied in other terminal precoders. In order to make the relay transmission power equal to $P_R$ and avoid noise enhancement at the relay, the relay precoder $F_R$ of the two-way AF MIMO relay system of the present invention can be represented as $F_R = \alpha K_R$, wherein $K_R$ is a unitary matrix and $\alpha = \sqrt{P_R / \text{tr}\{\sum_{i=1}^{2} \rho_i H_i H_i^H + \sigma^2 I_M\}}$ is the equal-power amplifying factor. In addition, in order to link the unitary matrix $K_R$ (as the candidate relay precoder) with the eigenmodes of the MIMO channels $H_j$ and $G_i$, the present invention applies the following three matrix/vector formulae:

$$\|G_i K_R H_j\|_F^2 = \|\text{vec}(G_i K_R H_j)\|_2^2;$$

$$\text{vec}(G_i K_R H_j) = (H_j^T \otimes G_i) \cdot k_R;$$

$$H_j^T \otimes G_i = (U_{H_j^T} \otimes U_{G_i}) \cdot (\Lambda_{H_j^T} \otimes \Lambda_{G_i}) \cdot (V_{H_j^T}^H \otimes V_{G_i}^H),$$

wherein $k_R = \text{vec}(K_R)$, $H_j^T = U_{H_j^T} \Lambda_{H_j^T} V_{H_j^T}^T$ and $U_{H_j^T} = V_H^*$, $\Lambda_{H_j^T} = \Lambda_{H_j}$, $V_{H_j^T} = U_H^*$. The Kronecker product matrix is represented by $B_i \otimes H_j^T \otimes G_i$ and the corresponding SVD is $U_{B_i} \Lambda_{B_i} V_{B_i}^H$. Then, the following equation is obtained:

$$(H_j^T \otimes G_i) k_R = U_{B_i} \Lambda_{B_i} V_{B_i}^H k_R.$$

From the above, it is clear that the $M^2$ eigenmodes (i.e., $\lambda_{B_{i,k}} v_{B_{i,k}}^H$, $k = 1, 2, \ldots, M^2$) are created by those of the MIMO channels $H_j$ and $G_i$. Therefore, by appropriately designing $k_R$, the directions (i.e., singular vectors) of these eigenmodes can be adjusted to obtain the desired singular values.

The design of $k_R$ must not only satisfy the unitary property, but also the full-rank property of the effective MIMO channels to obtain the full multiplexing gain. This can be satisfied by designing $k_R$ by choosing M exclusive eigenmodes from the aforementioned $M^2$ eigenmodes. Since $$\Lambda_{B_i} = \Lambda_{H_j^T} \otimes \Lambda_{G_i} \text{ and } V_{B_i}^H = V_{H_j^T}^H \otimes V_{G_i}^H$$

(that is, the $M^2$ singular values in $\Lambda_{B_i}$ and the $M^2$ singular vectors in $V_{B_i}^H$, are constructed by $$\Lambda_{H_j^T} \otimes \Lambda_{G_i} \text{ and } V_{H_j^T}^H \otimes \Lambda_{G_i}^H,$$

respectively, the key for designing $k_R$ lies in how to choose M column singular vectors from $V_{B_i}^H$, to form $k_R^H$ (that is, choose M row singular vectors from $V_{B_i}$ to form $k_R$) to obtain the M exclusive eigenmodes.

As an example for designing $k_R$, consider $M=2$ in the following. In this condition, the results of $$\Lambda_{B_i} = \Lambda_{H_j^T} \otimes \Lambda_{G_i} \text{ and } V_{B_i}^H = V_{H_j^T}^H \otimes V_{G_i}^H$$

can be expressed, respectively, as follow:

$$\Lambda_{B_i} = diag\{\lambda_{B_{i,1}} \ \lambda_{B_{i,2}} \ \lambda_{B_{i,3}} \ \lambda_{B_{i,4}}\}$$
$$= diag\{\lambda_{H_{j,1}^T} \lambda_{G_{i,1}} \ \lambda_{H_{j,1}^T} \lambda_{G_{i,2}} \ \lambda_{H_{j,2}^T} \lambda_{G_{i,1}} \ \lambda_{H_{j,2}^T} \lambda_{G_{i,2}}\}$$

$$V_{B_i}^H = [v_{B_{i,1}} \ v_{B_{i,2}} \ v_{B_{i,3}} \ v_{B_{i,4}}]^H = \begin{bmatrix} v_{H_{j,1}^T}^H \\ v_{H_{j,2}^T}^H \end{bmatrix} \otimes \begin{bmatrix} v_{H_{i,1}}^H \\ v_{G_{i,2}}^H \end{bmatrix} = \begin{bmatrix} v_{H_{j,11}^T}^* & v_{H_{j,21}^T}^* \\ v_{H_{j,12}^T}^* & v_{H_{j,22}^T}^* \end{bmatrix} \otimes \begin{bmatrix} v_{G_{i,1}}^H \\ v_{G_{i,2}}^H \end{bmatrix},$$

$$= \begin{bmatrix} v_{H_{j,11}^T}^* \begin{pmatrix} v_{G_{i,1}}^H \\ v_{G_{i,2}}^H \end{pmatrix} & v_{H_{j,21}^T}^* \begin{pmatrix} v_{G_{i,1}}^H \\ v_{G_{i,2}}^H \end{pmatrix} \\ v_{H_{j,12}^T}^* \begin{pmatrix} v_{G_{i,1}}^H \\ v_{G_{i,2}}^H \end{pmatrix} & v_{H_{j,22}^T}^* \begin{pmatrix} v_{G_{i,1}}^H \\ v_{G_{i,2}}^H \end{pmatrix} \end{bmatrix} = \begin{bmatrix} v_{H_{j,11}^T}^* v_{G_{i,1}}^H & v_{H_{j,21}^T}^* v_{G_{i,1}}^H \\ v_{H_{j,11}^T}^* v_{G_{i,2}}^H & v_{H_{j,21}^T}^* v_{G_{i,2}}^H \\ v_{H_{j,12}^T}^* v_{G_{i,1}}^H & v_{H_{j,22}^T}^* v_{G_{i,1}}^H \\ v_{H_{j,12}^T}^* v_{G_{i,2}}^H & v_{H_{j,22}^T}^* v_{G_{i,2}}^H \end{bmatrix}$$

wherein the eigenmodes $$\lambda_{B_{i,k}} v_{B_{i,k}}^H,$$

$k \in \{1, 2, 3, 4\}$, are formed from $$\lambda_{H_{j,m}^T} v_{H_{j,m}}^H \text{ and } \lambda_{G_{i,n}} v_{G_{i,n}}^H,$$

$\forall m,n \in \{1,2\}$.

Based on the above, the two exclusive eigenmodes and the corresponding singular values can be obtained by the combination of the two column singular vectors in $V_{B_i}$. Therefore, two kinds of the combinations of the column singular vectors can be chosen: (1) $k_{R_i}^{(1)}$ is constructed by the combination of the first column vector and the fourth column vector of $V_{B_i}$, that is, $k_{R_i}^{(1)} = v_{B_{i,1}} + v_{B_{i,4}}$ in order to obtain the respective eigenmodes corresponding to the singular values $$\lambda_{B_{i,1}} = \lambda_{H_{j,1}^T} \lambda_{G_{i,1}} \text{ and } \lambda_{B_{i,4}} = \lambda_{H_{j,2}^T} \lambda_{G_{i,2}};$$

(2) $k_{R_i}^{(2)}$ is constructed by the combination of the second column vector and the third column vector of $V_{B_i}$, that is, $k_{R_i}^{(2)} = v_{B_{i,2}} + v_{B_{i,3}}$ in order to obtain the respective eigenmodes corresponding to the singular values $$\lambda_{B_{i,2}} = \lambda_{H_{j,1}^T} \lambda_{G_{i,2}} \text{ and } \lambda_{B_{i,3}} = \lambda_{H_{j,2}^T} \lambda_{G_{i,1}}.$$

Reshaping the column vectors $k_{R_i}^{(l)}$ back into matrices $K_{R_i}^{(l)}$ (i.e., $K_{R_i}^{(l)} = \text{mat}(k_{R_i}^{(l)})$), $l \in \{1,2\}$, we get:

$$K_{R_i}^{(1)} = [v_{G_{i,1}} \; v_{G_{i,2}}] \begin{bmatrix} v_{H_{j,1}}^T \\ v_{H_{j,2}}^T \end{bmatrix} = [v_{G_{i,1}} \; V_{v_{i,2}}] \begin{bmatrix} u_{H_{j,1}}^H \\ u_{H_{j,2}}^H \end{bmatrix};$$

$$K_{R_i}^{(2)} = [v_{G_{i,2}} \; v_{G_{i,1}}] \begin{bmatrix} v_{H_{j,1}}^T \\ v_{H_{j,2}}^T \end{bmatrix} = [v_{G_{i,2}} \; V_{v_{i,1}}] \begin{bmatrix} u_{H_{j,1}}^H \\ u_{H_{j,2}}^H \end{bmatrix}.$$

The working principles of the relay precoders of the present invention are described as follows. For the effective MIMO channel $\tilde{H}_i$, the same-order eigenmodes of the MIMO channels $H_j$ and $G_i$ are matched together by the unitary matrix $K_{R_i}^{(1)}$, while the first eigenmode of $H_j$ is matched to the second eigenmode of $G_i$ by $K_{R_i}^{(2)}$, and the second eigenmode of $H_j$ is matched to the first eigenmode of $G_i$ by $K_{R_i}^{(2)}$. On the other hand, for $\tilde{H}_j$, the unitary matrices $K_{R_i}^{(l)}$, $l \in \{1,2\}$ rotate the corresponding singular vector subspaces to adjust the singular values.

In an embodiment, for the general case with $M \geq 2$, the candidate relay precoding set $S_i$ can be constructed as follows:

$$S_i \triangleq \left\{ K_{R_i}^{(l)} : \text{mat}(k_{R_i}^{(l)}), k_{R_i}^{(l)} = \sum_{m=1}^{M} v_{B_{i,[P]_{l,m}}}, l = 1, \ldots, L \right\},$$

wherein $i \in \{1,2\}$, $L=M!$ denotes the size of the precoding set for $S_i$, P is an index matrix with its elements $[P]_{l,m} = (m-1)M + [Q]_{l,m}$, and $Q = [q_1 \ldots q_L]^T$ describes all permutations of the set $\{1, 2, \ldots, M\}$. The total size of the overall candidate relay precoding set is 2L.

If the power of the terminal precoder $F_j$, $j \in \{1,2\}$, is not equal among antennas, (that is, $F_j \neq \sqrt{\rho_j} I_m$), the effect of $F_j$ should not be neglected during the design phase of the relay precoders of the present invention. In this circumstance, the channel matrix $H_j$ is simply replaced with $H_j F_j$, then the same procedures can be used in developing the candidate relay precoding set.

Upon completing the construction of the candidate relay precoding set, the relay precoder with the best performance, that is, the best eigenmodes, can be selected from the set based on any design criterion. Below, the minimum sum of MSEs, the maximum sum of channel capacities, the minimum sum of condition numbers, and the maximum sum of condition numbers are considered as examples of the design criterion, but the present invention is not limited thereto; wherein the condition number is defined as the ratio of the largest to the smallest singular value of a MIMO channel.

For the design criterion based on the minimum sum of MSEs, the relay precoder is selected as follows:

$$K_R^{MSE} = \arg \min_{K_R \in \{S_1, S_2\}} J_1 + J_2.$$

For the design criterion based on the maximum sum of channel capacities, the relay precoder is selected as follows:

$$K_R^C = \arg \max_{K_R \in \{S_1, S_2\}} C_1 + C_2.$$

The designed (or selected) relay precoder can select the best eigenmodes and the corresponding singular values of the effective MIMO channel to meet specific design criterion (i.e., approaching the lower bound of the MSE). Basically, these two methods are capable of selecting the relay precoder with the best performance from the finite candidate relay precoding set, thus having the advantage of low complexity.

In order to further reduce the complexity, the asymptotic behavior of the aforementioned lower bound of the MSE is examined; in high signal-to-noise ratio (SNR) regimes, the asymptotic lower bound of the MSE corresponding to the mth data stream can be represented as:

$$\lim_{\rho_j \to \infty} \widetilde{mse}_{i,m} = \frac{\sigma^2 \alpha^2 \lambda_{G_{i,m}}^2 + \sigma^2}{\lambda_{H'_{i,m}}^2},$$

wherein $$\lambda_{H'_{i,m}} = \alpha \lambda_{G_{i,m}} \lambda_{H_{j,m}}$$

is the mth singular value of the effective MIMO channel $H_i' \triangleq G_i F_R H_j$ and $m \in \{1, 2, \ldots, M\}$. Accordingly, an asymptotic lower bound of the MSE $J_i$ and an asymptotic upper bound of the channel capacity $C_i$ can be respectively written as:

$$J_i \geq \tilde{J}_i = \sum_{m=1}^{M} \frac{\sigma^2 \alpha^2 \lambda_{G_{i,m}}^2 + \sigma^2}{\lambda_{H'_{i,m}}^2}; \; C_i \leq \tilde{C}_i = \sum_{m=1}^{M} \log_2 \frac{\lambda_{H'_{i,m}}^2}{\sigma^2 \alpha^2 \lambda_{G_{i,m}}^2 + \sigma^2}.$$

From these two equations, we can see that, at high SNRs, the performance of the MSE and the channel capacity are dominated by the smallest singular value and the largest singular value of the effective MIMO channel, respectively. In conventional MIMO systems, the condition number is often used to provide an indication to measure a MIMO channel, and it is defined as follows:

$$c_A = \lambda_{max}/\lambda_{min} \leq 1,$$

wherein $\lambda_{max}$ and $\lambda_{min}$ are the largest singular value and the smallest singular value of a given channel matrix A, respectively. Specifically, if a MIMO channel has a large condition number, it is called an ill-conditioned channel; otherwise, a MIMO channel that has a small condition number is called a well-conditioned channel. Based on the above observations, the minimum or maximum sum of condition numbers of the effective MIMO channels $\tilde{H}_1$ and $\tilde{H}_2$ is applied as the design criterion for selecting the relay precoder with the best performance from the constructed candidate relay precoding set.

For the design criterion based on the minimum sum of condition numbers, the relay precoder is selected as follows:

$$K_R^{CN_{min}} = \arg\min_{K_R \in \{S_1, S_2\}} c_{\tilde{H}_1} + c_{\tilde{H}_2}.$$

The precoder selected from this method results in the singular values of the effective MIMO channels to be as equal as possible, and thus an effect approaching the minimum sum of the MSEs is anticipated. For the design criterion based on the maximum sum of condition numbers, the relay precoder is selected as follows:

$$K_R^{CN_{max}} = \arg\max_{K_R \in \{S_1, S_2\}} c_{\tilde{H}_1} + c_{\tilde{H}_2}.$$

The precoder selected from this method results in the singular values of the effective MIMO channel to be as large as possible, and thus an effect approaching the maximum sum of the channel capacities is anticipated.

The computational complexity is evaluated in terms of the number of floating point operations (flops) for the iterative algorithm of the prior art, the proposed scheme based on the minimum sum of MSEs, the proposed scheme based on the maximum sum of channel capacities, and the proposed scheme based on the minimum or the maximum sum of condition numbers of the present invention. The results are listed in the following table, wherein $N_{out}$ denotes the outer iteration number for the optimization of the decoders $W_i$, $i \in \{1,2\}$, in the iterative algorithm and $N_{in}$ represents the inner iteration number for obtaining the relay precoder itself.

As shown in FIG. 2, the relay precoder selection method for two-way AF MIMO relay systems in accordance with the present invention includes the following three main steps:

Step S21: Two-way MIMO channel information between at least two terminals and a relay is obtained;

Step S22: A candidate relay precoding set is constructed based on the two-way MIMO channel information;

Step S23: A relay precoder with the best performance is selected from the candidate relay precoding set; the allowed design criteria for the selection include, but are not limited to, the minimum sum of MSEs, the maximum sum of channel capacities, the minimum sum of condition numbers, the maximum sum of condition numbers, and so on.

Figure 3:
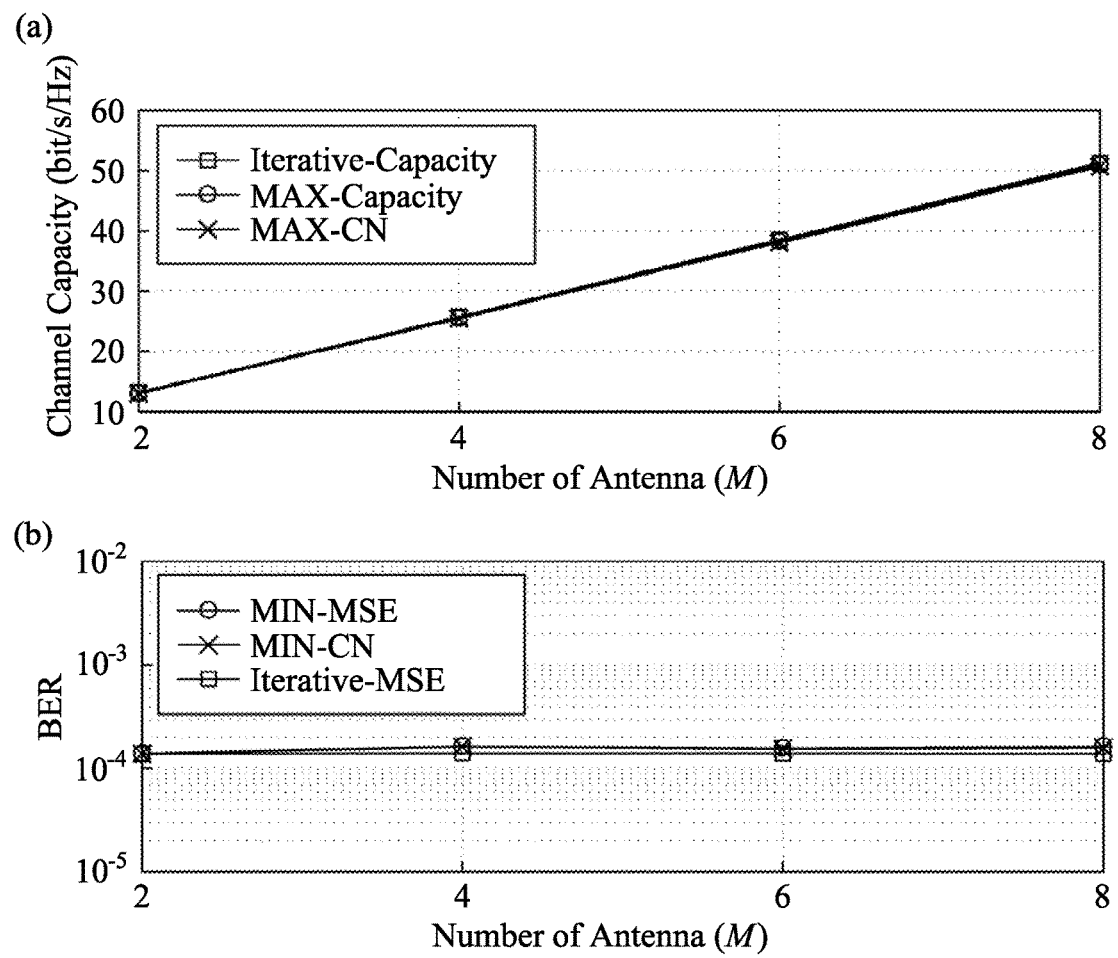
FIG. 3 is a graph depicting the channel capacity with signal-to-noise ratio (SNR)=30 dB and the bit-error-rate (BER) performance with SNR=40 dB versus the number of antennas for the relay precoder design schemes of the present invention and the prior art.

For evaluating the performance of the proposed relay precoder designs, the Monte Carlo method is used to simulate the performance of the present invention. Assume that the transmit power at each node has unit energy (i.e., $P_T = P_i = 1$, $i \in \{1,2,R\}$) and that the SNRs at all nodes are identical (i.e., $P_T/\sigma^2$) for all numerical evaluations. The number of antennas is set to be M=4 (except for FIG. 3); in simulating the MSE performance, quadrature phase-shift keying (QPSK) modulation is adopted. As shown in FIG. 3, the present invention approaches the performance of the iterative algorithms (Iterative-MSE and Iterative-Capacity), even when the number of antennas is large.

Figure 4:
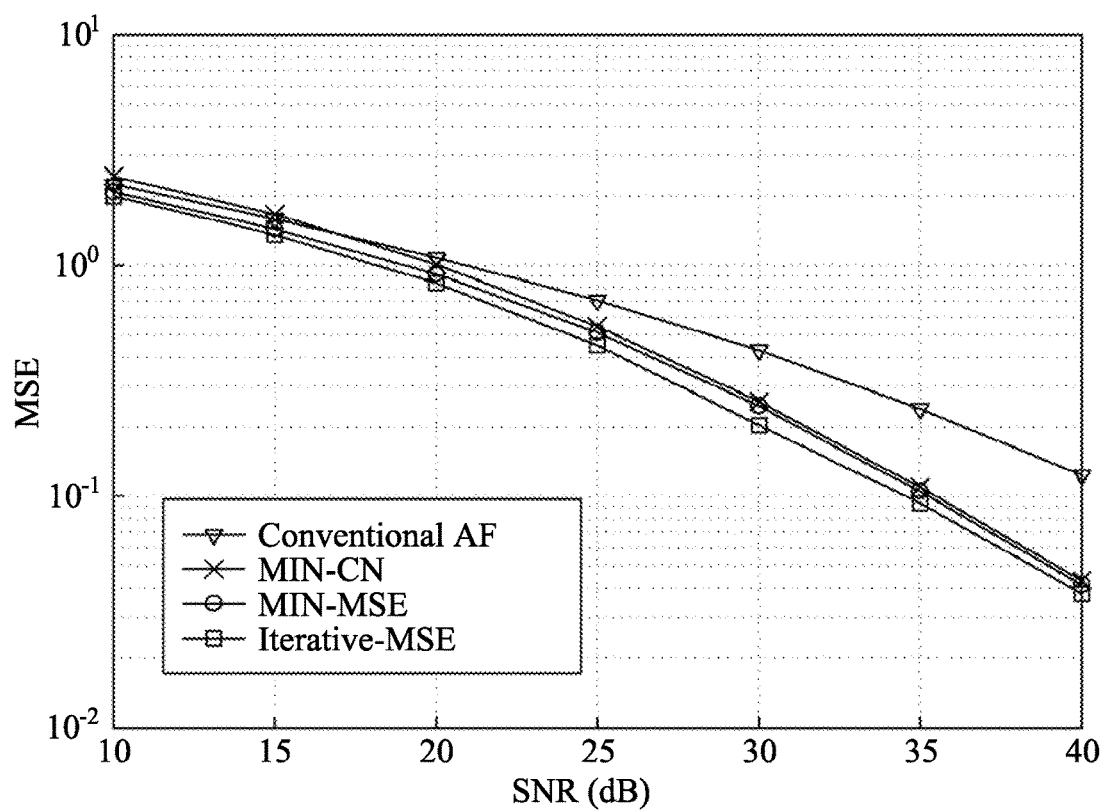
FIG. 4 is a graph depicting the mean-squared error (MSE) performance versus SNR for the relay precoder design schemes of the present invention and the prior art.

As shown in FIG. 4, the MSE performance of the method based on the minimum sum of the MSEs (MIN-MSE) is better than that of the method based on the minimum sum of condition numbers (MIN-CN). At high SNRs, the MSE performance of both the MIN-MSE and MIN-CN methods approach the Iterative-MSE scheme.

Figure 5:
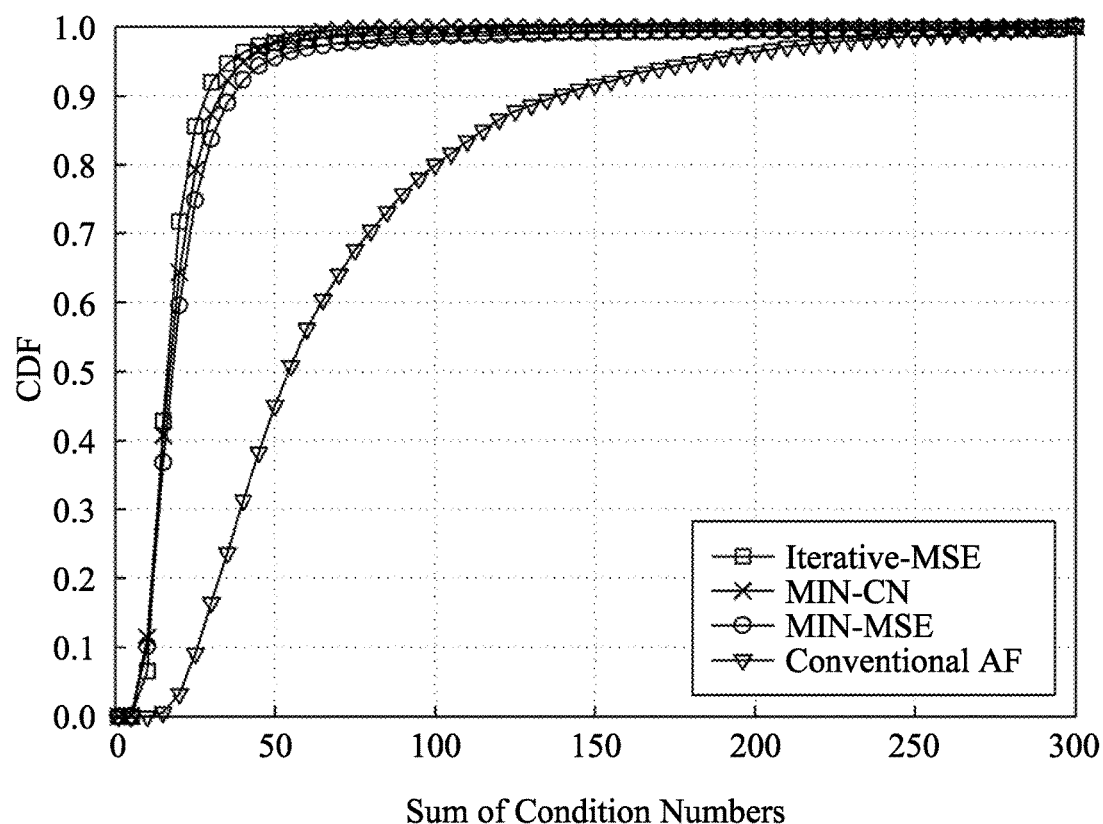
FIG. 5 is a graph depicting the cumulative distribution functions of the sum of condition numbers $c_{sum}$ with SNR=30 dB for the relay precoder design schemes of the present invention and the prior art.

FIG. 5 shows the cumulative distribution function (CDF) of the sum of condition numbers $c_{sum}$ with SNR=30 dB. It can be seen that the MIN-CN method provides more well-conditioned channels than the MIN-MSE method, and the results of these two methods are close to that of the Iterative-MSE scheme, but far better than the conventional method (Conventional AF).

Figure 6:
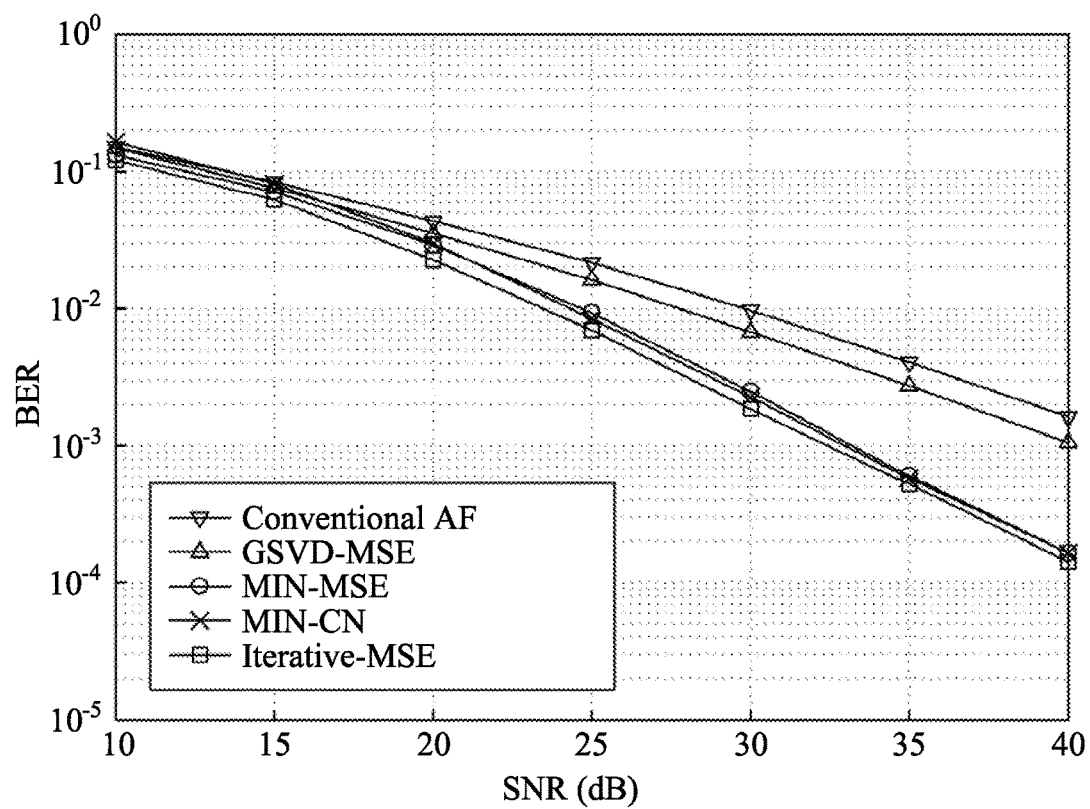
FIG. 6 is a graph depicting the BER performance versus SNR for the relay precoder design schemes of the present invention and the prior art.

FIG. 6 compares the bit-error-rate (BER) performance for different relay precoder designs, wherein the performance of the Conventional AF and the GSVD scheme are noticeably poorer. At low SNRs (e.g., 10 dB), the MIN-MSE method has better performance than MIN-CN, and the opposite is true at high SNRs (e.g., 30 dB). The MIN-MSE and MIN-CN methods both provide close BER performance to the Iterative-MSE scheme.

| Computational Complexity (flops) | |
| --- | --- |
| Iterative Algorithm | $N_{out} \cdot \{112M^3 + N_{in} \cdot (\frac{160}{3}M^6 + 306M^4 + \frac{1414}{3}M^3 + 134M^2)\}$ |
| Minimum Sum of MSEs | $2M^4 + 48M^3 + 2L + 2L\{(M^3 - M^2) + 2 \cdot (14M^3 - 3M^2 + 5M)\}$ |
| Maximum Sum of Channel Capacities | $2M^4 + 48M^3 + 2L + 2L\{(M^3 - M^2) + 2 \cdot (\frac{41}{3}M^3 - 4M^2 + 3M)\}$ |
| Minimum or Maximum sum of Condition Numbers | $2M^4 + 48M^3 + 2L + 2L(M^3 - M^2 + 6)$ |

Figure 8:
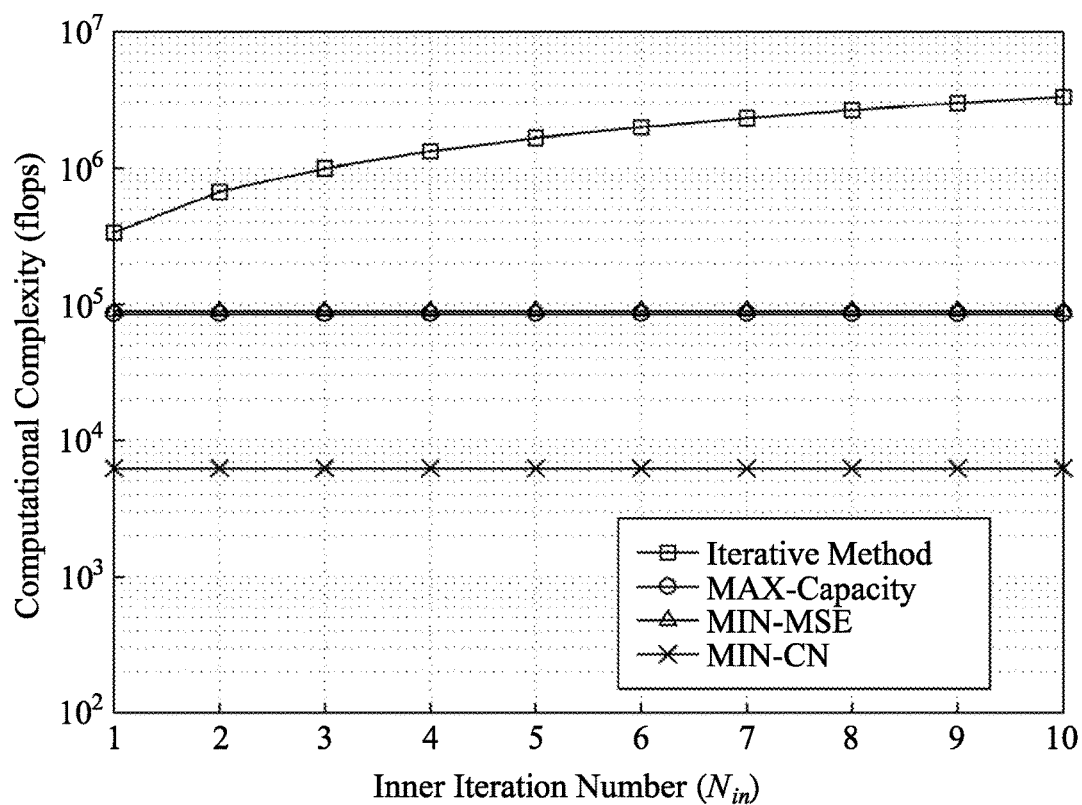
FIG. 8 is a graph depicting the computational complexity versus the inner iteration number for the relay precoder design schemes of the present invention and the prior art.

As demonstrated by some numerical results below (as shown in FIG. 8), the proposed schemes of the present invention involve lower computational complexity than the iterative method, even if $N_{in} = N_{out} = 1$ (i.e., without iteration).

Figure 7:
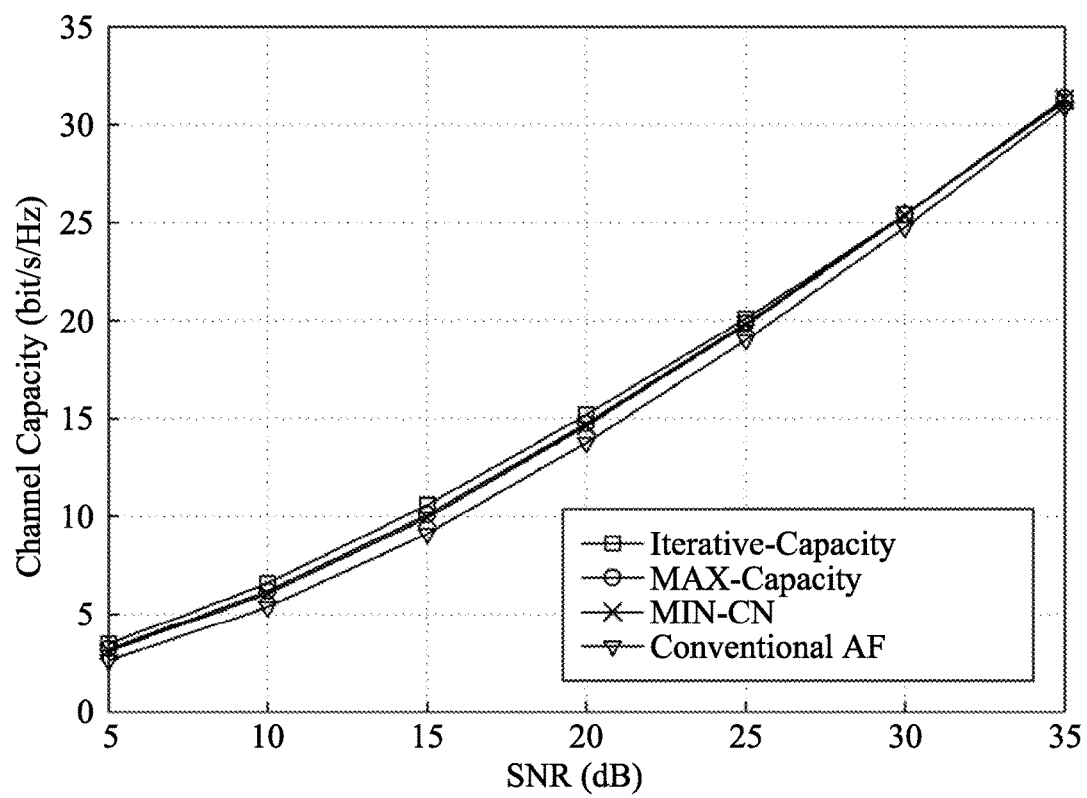
FIG. 7 is a graph depicting the channel capacity versus SNR for the relay precoder design schemes of the present invention and the prior art.

FIG. 7 compares the channel capacities for different relay precoder designs. It can be seen that the method based on the maximum sum of channel capacities (MAX-Capacity) and the method based on the maximum sum of condition numbers (MAX-CN) both approach the channel capacity of the Iterative-Capacity scheme and outperform the Conventional AF scheme.

FIG. 8 compares the number of the flops required by different relay precoder designs, wherein the outer iteration number $N_{out}$ of the iterative algorithm is set to 1. It should be noted that the computational complexity of the MAX-CN method is the same as that of the MIN-CN method; thus, only MIN-CN is considered in FIG. 8. It is clear that, with similar performance, the proposed schemes (MIN-MSE, MAX-Capacity, and MIN-CN) of the present invention always have lower computational complexity than the iterative method, even if the outer iteration number $N_{out}$ and the inner iteration number $N_{in}$ of the iterative method are both set to 1. In addition, among these methods, it can be observed that the MIN-CN method has the lowest computational complexity.

In an embodiment, the relay precoder selection method for two-way AF MIMO relay systems in accordance with the present invention can be performed at a relay communication device (a relay), and then the relay precodes the received signal vectors based on the selected precoding matrix. Alternatively, the method of the present invention can be performed first by another communication device, and then the selected precoding matrix is transmitted to the relay communication device for precoding the received signal vector.

With the relay precoder selection method for two-way AF MIMO relay systems in accordance with the present invention, a communication device that uses the selection method, and a relay communication device that is equipped with the selected relay precoder, we can obtain the best relay precoder that satisfies the design criterion from a finite relay precoding set. This allows the two-way relay systems to have lower computational complexity while providing close performance to the iterative algorithm of the prior art. Therefore, the cost is reduced and the transmission efficiency is improved.

The above embodiments are only used to illustrate the principles of the present invention, and should not be construed as to limit the present invention in any way. The above embodiments can be modified by those with ordinary skill in the art without departing from the scope of the present invention as defined in the appended claims.

What is claimed is:

1. A relay precoder selection method for two-way amplify-and-forward (AF) multiple-input multiple-output (MIMO) relay systems, comprising:
obtaining two-way MIMO channel information between at least two terminals and a relay, wherein the two-way MIMO channel information includes forward and backward MIMO channels, and each of the forward and backward MIMO channels has a plurality of eigenmodes, and each of the plurality of eigenmodes corresponds to a singular value and a singular vector;
constructing a candidate relay precoding set based on the two-way MIMO channel information, wherein the candidate relay precoding set includes a plurality, of candidate relay precoders, and the plurality of the candidate relay precoders are constructed based on the relationship between a relay precoder and the singular values of the effective MIMO channels, wherein an effective MIMO channel is formed based on a cascade effect of the forward and backward MIMO channels, the two terminal precoders, and the relay precoder; and
selecting a relay precoder with the best performance from the candidate relay precoding set, wherein the relay precoder with the best performance is selected from the candidate relay precoding set based on a design criterion of the minimum sum of condition numbers or the maximum sum of condition numbers, wherein the condition number is a ratio of the largest to the smallest singular values of the corresponding MIMO channel.

2. The relay, precoder selection method of claim 1, wherein all possible eigenmodes are formed based on the cascade effect, from which singular vectors that correspond to a set of mutually exclusive eigenmodes are selected to combine into a column vector, and the column vector is converted into a matrix for obtaining the candidate relay precoders.

3. The relay precoder selection method of claim 2, wherein a plurality of candidate relay precoders generated by a plurality of sets of mutually exclusive eigenmodes are selected based on the two-way MIMO channel information to construct the candidate relay precoding set.

4. The relay precoder selection method of claim 1, wherein the relay precoder with the best performance is selected from the candidate relay precoding set based on a design criterion of the minimum sum of mean-squared errors (MSEs).

5. The relay precoder selection method of claim 1, wherein the relay precoder with the best performance is selected from the candidate relay precoding set based on a design criterion of the maximum sum of channel capacities.

6. A communication device used for performing the relay precoder selection method for two-way AF MIMO relay systems of claim 1.

7. A relay communication device equipped with the relay precoder with the best performance selected using the relay precoder selection method for two-way AF MIMO relay systems of claim 1.

* * * * *